US011037004B2

(12) United States Patent
Kratochvil et al.

(10) Patent No.: US 11,037,004 B2
(45) Date of Patent: Jun. 15, 2021

(54) COMMUNICATION DEVICE OF A MOTOR VEHICLE

(71) Applicant: Varroc Lighting Systems, s.r.o., Senov u Noveho Jicina (CZ)

(72) Inventors: Jan Kratochvil, Horka-Domky (CZ); Michaela Duliakova, Ostrava-Belsky les (CZ); Stanislav Klimicek, Fulnek (CZ); Vaclav Stihel, Novy Jicin (CZ); Karolina Pichova, Albrechtice u Cs. Tesina (CZ)

(73) Assignee: Varroc Lighting Systems, S.R.O., Senov U Noveho (CZ)

( * ) Notice: Subject to any disclaimer, the term of this patent is extended or adjusted under 35 U.S.C. 154(b) by 109 days.

(21) Appl. No.: 15/925,512

(22) Filed: Mar. 19, 2018

(65) Prior Publication Data

US 2018/0276486 A1    Sep. 27, 2018

(30) Foreign Application Priority Data

Mar. 21, 2017   (CZ) .................. CZ2017-160

(51) Int. Cl.
*G06K 9/00* (2006.01)
*H04B 10/114* (2013.01)
(Continued)

(52) U.S. Cl.
CPC ....... *G06K 9/00825* (2013.01); *H04B 10/114* (2013.01); *H04B 10/40* (2013.01); *H04W 4/44* (2018.02); *H04W 4/46* (2018.02)

(58) Field of Classification Search
CPC .. G06K 9/00825; H04B 10/114; H04B 10/40; H04W 4/44; H04W 4/46
See application file for complete search history.

(56) References Cited

U.S. PATENT DOCUMENTS

2011/0098877 A1   4/2011  Stahlin et al.
2012/0268262 A1* 10/2012  Popovic .................. G08G 1/166
                                                                    340/438
(Continued)

FOREIGN PATENT DOCUMENTS

CN       106043104 A      10/2016
DE    102012011994 A1     12/2013
(Continued)

OTHER PUBLICATIONS

Bazzi, Alessandro et al., Visible Light Communications in Vehicular Networks for Cellular Offloading, IEEE ICC 2015, Workshop on "Visible Light Communications and Networking", pp. 1416-1421, http://ieeexplore.ieee.org/abstract/document/7247377/), Aug. 6, 2015 (Abstract, 1 page).

(Continued)

*Primary Examiner* — John W Lee
(74) *Attorney, Agent, or Firm* — Hovey Williams LLP

(57) ABSTRACT

A communication device is provided for a motor vehicle that works with traffic-relevant information provided through light signals. The communication device comprises a primary imaging optical system to create the input image from the received scenic image, which may comprise a light car2car signal and/or a light car2X signal including traffic-relevant information. It further comprises a DMD array of mirrors for receiving the input image and transmitting it to a primary optical sensor adapted to convert the input optical image to an electric signal for processing, to thereby find out whether and what places of the input image sources of the signals are found in.

11 Claims, 3 Drawing Sheets

(51) Int. Cl.
  *H04W 4/46*   (2018.01)
  *H04W 4/44*   (2018.01)
  *H04B 10/40*  (2013.01)

(56) References Cited

U.S. PATENT DOCUMENTS

| | | | |
|---|---|---|---|
| 2013/0131918 A1* | 5/2013 | Hahne | G08G 1/096791 |
| | | | 701/36 |
| 2014/0104077 A1 | 4/2014 | Engel et al. | |
| 2014/0204385 A1* | 7/2014 | Ouyang | G01N 21/47 |
| | | | 356/445 |
| 2017/0084172 A1* | 3/2017 | Rolle | G08G 1/04 |
| 2018/0009374 A1* | 1/2018 | Kim | G03B 21/2013 |

FOREIGN PATENT DOCUMENTS

| | | | |
|---|---|---|---|
| JP | 2005182455 A | | 7/2005 |
| KR | 20100049488 A | | 5/2010 |
| WO | 2014/204794 A1 | | 12/2014 |

OTHER PUBLICATIONS

Yoo, J.-H, et al., Demonstration of vehicular visible light communication based on LED headlamp, International Journal of Automotive Technology, vol. 17, No. 2, pp. 347-352 (2016), Jun. 8, 2015 (Abstract, 1 page).

Kodama, Motoi et al., Motoi Kodama and Shinichiro HaruyamaA Fine-Grained Visible Light Communication Position Detection System Embedded in One-Colored Light Using DMD Projector, Mobile Information Systems vol. 2017 (2017), Article ID 9708154), Mar. 21, 2017 (11 pages).

Luo, Pengfei et al., Fundamental Analysis of a Car to Car Visible Light Communication System, Networks & Digital Signal Processing (CSNDSP), 2014 9th International Symposium on Communication Systems, Oct. 16, 2014 (Abstract, 1 page).

Search Report from Corresponding Czech Application No. PV 2017-160 dated Dec. 11, 2017 (3 pages).

\* cited by examiner

COMMUNICATION DEVICE OF A MOTOR VEHICLE

FIELD OF THE INVENTION

The invention relates to a communication device of a motor vehicle working with traffic-relevant information through light signals.

BACKGROUND INFORMATION

Current trends and outlooks indicate that the exterior lighting of motor vehicles is gradually abandoning the conventional passive functionality, i.e. lighting and giving signals to traffic participants, and is becoming an active component of communication in road traffic within the enhancement of safety and comfort of road transport. The electric and electronic equipment of a vehicle represents the nervous system of the car, which influences all segments and integrates them into one whole to ensure proper and safe operation of the vehicle. An exterior lighting device, i.e. a headlight or signal lamp should not only be perceived as the output of light or an indication of a change of the driving direction and braking as it is common now. Through respective signals inside and outside the vehicle, the lighting equipment should be the source of more information and should make it possible to receive or transmit signals to enhance the driving comfort of vehicles passing by or to increase safety of the passengers of the entire vehicle.

The documents WO2014204794A1, US20140104077A1, DE102012011994A1, US20110098877A1, CN106043104A describe many solutions enabling communication among vehicles. Vehicles can communicate with each other using the Car2Car signal or they can provide each other with certain signals or information. The Car2Car system, i.e. vehicle-vehicle communication, or the Car2X system, i.e. vehicle-infrastructure communication, helps the driver avoid places with a high degree of traffic load or informs about approaching danger among other things. A disadvantage of the prior art is the fact that detection of the Car2Car or Car2X signal is not possible in a reasonable range and with acceptable signal quality. Several types of communication protocols are defined for the Car2Car or Car2X communication system, for some types of services existing communication networks, e.g. GPRS or UMTS, wifi can be used to transmit the required information. Current means for detection of the Car2Car signal or Car2X signal do not enable quick detection and do not make it possible to detect high frequency of a light function emitted by the lighting equipment of a vehicle with sufficient accuracy. Concerning phototransistors or photodiodes, they are not sufficiently sensitive and do not have any spatial detection to be able to provide the required degree of detection with sufficient accuracy.

The object of the invention is to introduce a new communication device of a motor vehicle that uses the Car2Car or Car2X light signal emitted by other traffic participants or the infrastructure wherein the received signals are registered with sufficient accuracy, speed and quality and image signals and images are subsequently processed into data information and handed over to the electric or electronic equipment of the vehicle for further use.

SUMMARY OF THE INVENTION

The above-mentioned objects of the invention are fulfilled by a communication device of a motor vehicle comprising a primary imaging optical system to create the input image from the received scenic image, which may comprise a light car2car signal and/or a light car2X signal including traffic-relevant information, a DMD (digital micromirror device) array of mirrors for the reception of the input image and its subsequent transmission via a secondary imaging optical system to a primary optical sensor. The primary optical sensor is adapted to convert the input optical image received this way to an electric signal and to send it to an electronic control unit that is adapted to process the electric signal to find out whether and what places of the input image sources of car2car signal or car2X signal are found in, and if such a place or places are present in the particular input image, to convert the positions of pixels corresponding to them on the primary optical sensor to positions of individual mirrors in the DMD array and to send a control signal to the DMD array, which the electronic control unit is connected to, to change the position of the respective mirrors in the DMD array based on the established positions to reroute the said places of the input image via an optical member to a secondary optical sensor. The secondary optical sensor is adapted to convert an optical signal to an electric signal and to send it to the electronic control unit to evaluate and to create decoded information, wherein the electronic control unit is further connected to the electronic equipment of the vehicle for the transfer of decoded information from the primary and/or secondary optical sensor to the electronic equipment of the vehicle.

Position of the mirrors of the DMD array can be controlled by the electronic control unit by means of a control signal in such a way that after the said rerouting of the input image to the secondary optical sensor, the position of the mirrors can be reset for sending of the subsequent input image to the primary optical sensor.

The said car2X light signal is preferably emitted by infrastructure, especially traffic lights or another stationary light signaling device, and the said Car2car signal is preferably emitted by a light device of an oncoming vehicle, a vehicle travelling in the same direction or a standing vehicle.

A car2X or car2car light signal preferably provides one or more of the following types of traffic-relevant information: information about the duration of individual colors of traffic lights, information about the traffic situation, e.g. panic braking, traffic density, traffic jams, conditions of surrounding vehicles, obstacles on the way, congestions, accidents, climatic conditions, carriageway conditions, or insufficient distance.

In one of preferred embodiments, the motor vehicle comprises a light device to send a car2car or car2X light signal to the owner of the infrastructure or the other vehicles, and the said electronic equipment of the motor vehicle is connected to this light device to ensure the possibility of issuing a command for this light device to send the said car2car or car2X light signal based on decoded information.

The said light device is preferably part of the lighting equipment of the motor vehicle.

The said electronic equipment is, e.g., an AU application unit or OBU on-board unit. AU application unit is meant to be a control unit on board of a vehicle performing a dedicated function (e.g. calculation of an angle of inclination depending on the loading). OBU on-board unit is meant to be a control unit processing data from vehicle and controlling, based on the data, some devices (e.g., in the case of a lighting unit, position of levers and switches is monitored, and lights are switched on and off accordingly).

The primary imaging optical system is preferably an objective.

The primary optical sensor is preferably a CCD chip.

The optical member is preferably a focusing optical unit.

The secondary optical sensor is preferably a phototransistor.

DESCRIPTION OF DRAWINGS

The present invention will be further clarified in more detail with the use of embodiment examples referring to the enclosed drawings where.

DETAILED DESCRIPTION OF EMBODIMENTS OF THE INVENTION

Figure 1:
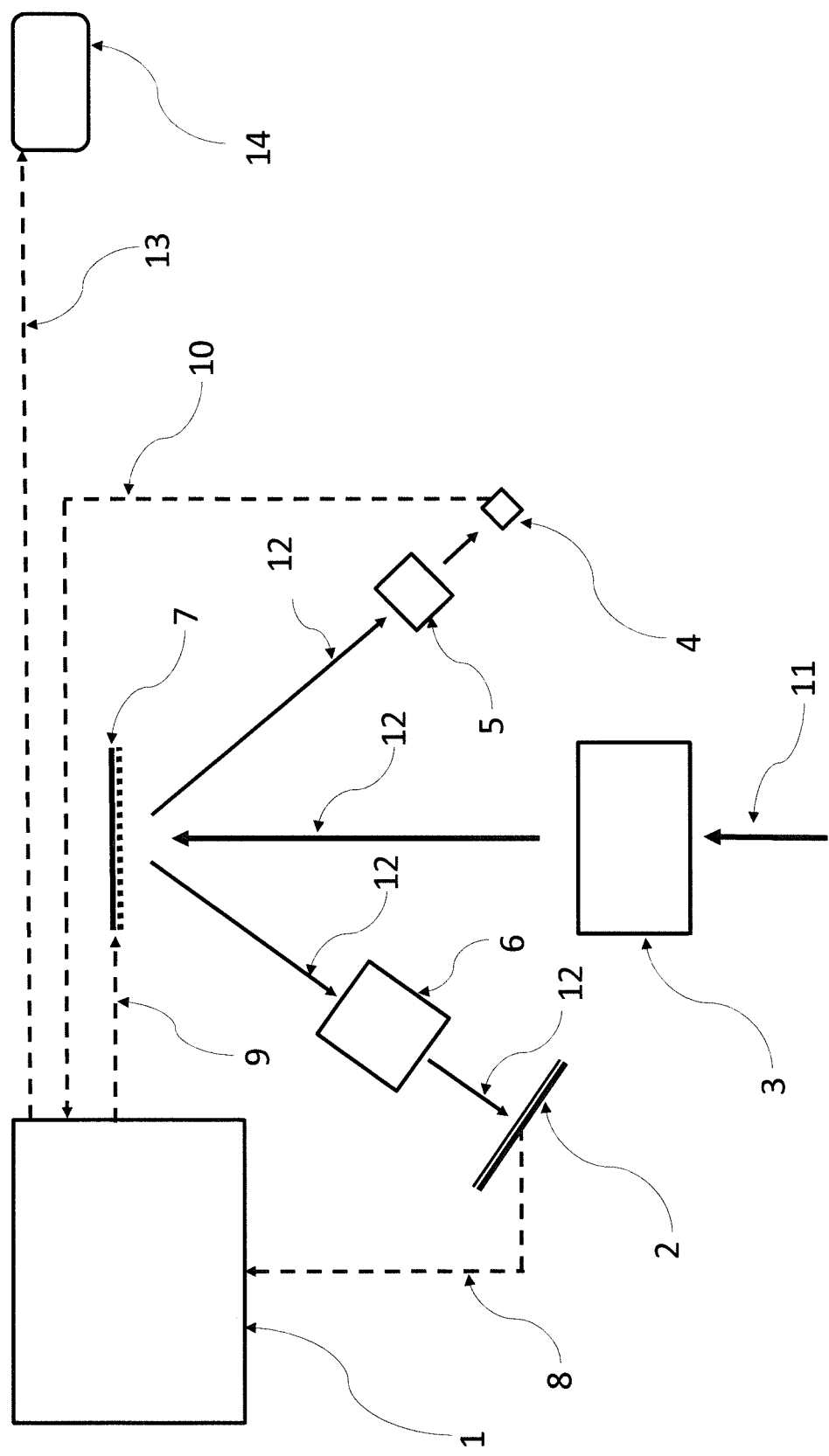
FIG. 1 shows a block diagram of the architecture of the communication device of a motor vehicle.

An embodiment example of the invention will now be described with reference to the attached FIG. 1. The communication device in accordance with the invention comprises the primary imaging optical system 3 to produce the input image 12 from the received scenic image 11 and a DMD array 7 of mirrors for subsequent transmission via the secondary imaging optical system 6 to the primary optical sensor 2. As explained further below, the DMD array 7 of mirrors is also used to send relevant parts of the input image 12 via the optical member 5 to the secondary optical sensor 4.

The optical sensors 2, 4 are adapted to produce signals 8, 10 and to send them to the electronic control unit 1. The electronic control unit 1 is further interconnected with the electronic equipment 14 of the vehicle for transfer of information 13. The electronic equipment 14 can be e.g. an AU application unit or OBU on-board unit.

Figure 2:
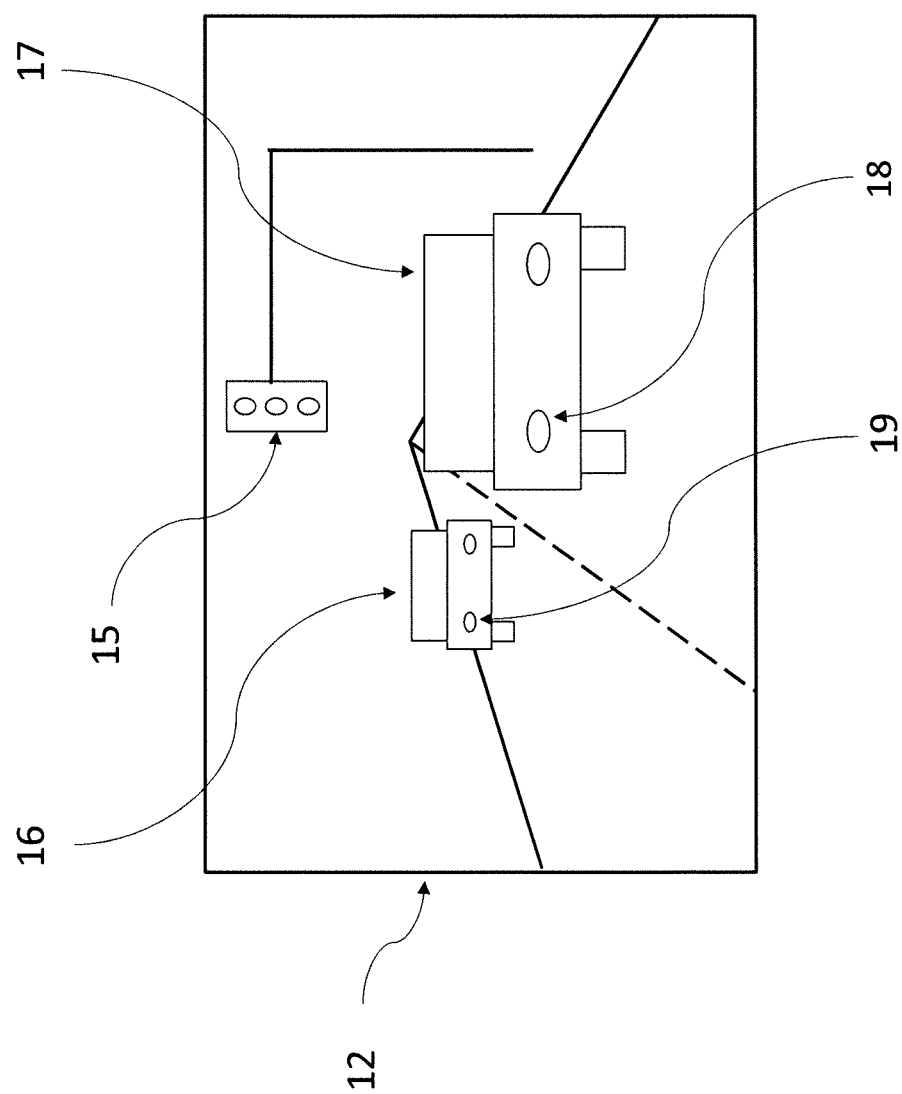
FIG. 2 shows an input image with the record of important information or objects.

FIG. 2 shows the input image 12 on the DMD array 7 or on the primary optical sensor 2 where infrastructure 15, e.g. traffic lights, is shown, sending a car2X signal or an image comprising, e.g., information about the duration of individual colors, and an oncoming vehicle 16 sending a car2car signal or an image through the front lighting equipment 19. Further, in an example of the input image 12, a vehicle 17 travelling in the same direction is displayed, sending through its rear lighting equipment 18 another car2car signal comprising other information about the traffic situation, e.g. information about panic braking.

The traffic-relevant information is coded in the scenic image 11 e.g. by means of a light modulation (a frequency modulation and/or amplitude modulation). Basically, the light is flashing with changing frequency and/or amplitude. It is a similar principle as for a transfer using radio waves, but a different part of electromagnetic spectrum—a visible range, is used.

Figure 3:
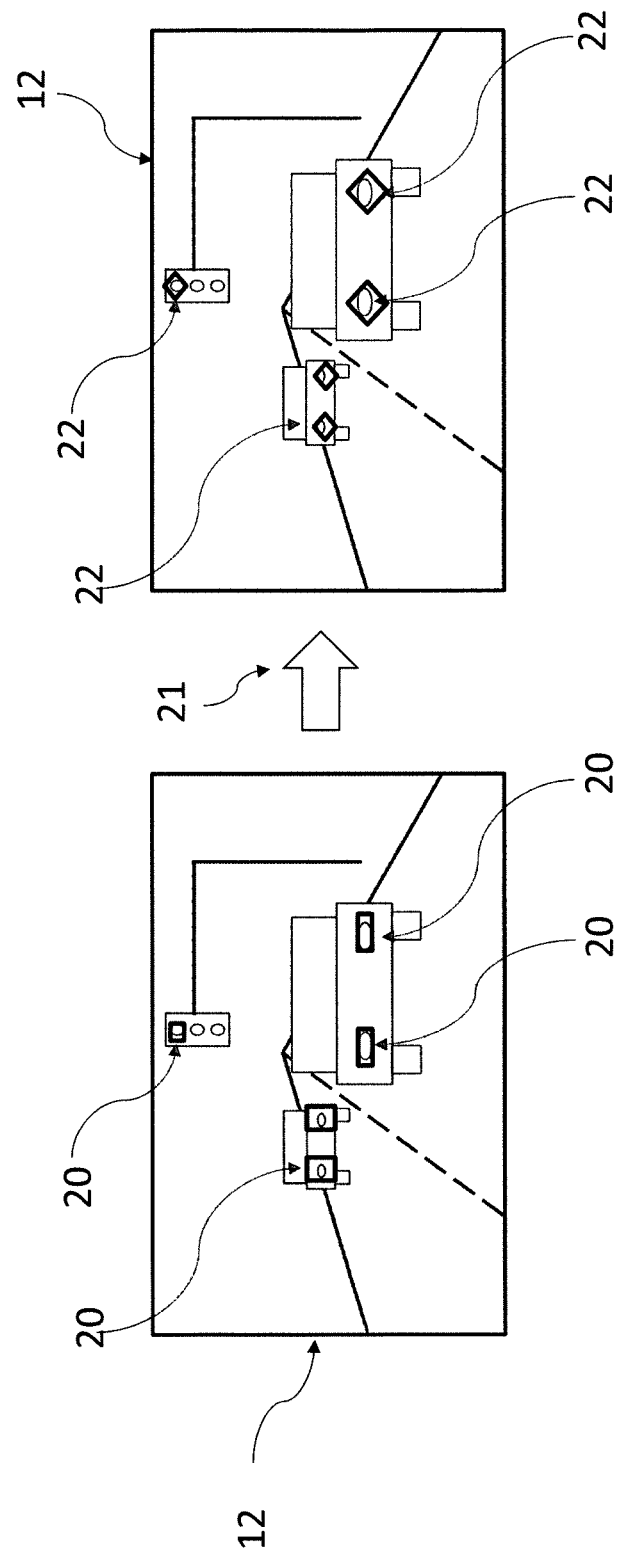
FIG. 3 shows transformation of the information about the position of important objects.

FIG. 3 shows the input image 12 displayed on the primary or secondary optical sensor 2, 4, showing the detected areas in the form of pixel positions 20, or in the pixel resolution of the CCD chip of the optical sensors 2, 4 on the one hand, and the input image 12 of the detected areas in the form of DMD positions 7 obtained from the pixel positions 20 by conversion 21 to the resolution of the DMD array 7.

A car2car signal emitted by the lighting devices 18, 19 and/or a car2X signal emitted by the infrastructure 15 is captured within the scenic image 11 and comprises, e.g., information about the traffic density or a traffic congestion, status of the surrounding vehicles 16, 17 etc. This scenic image 11 is recorded by the primary imaging optical system 3, e.g. an objective, and it is subsequently displayed/sent in the form of an input image 12 to the DMD array 7 of mirrors. In the first stage, the mirrors of the DMD array 7 are directed in such a way that the input image 12 is, by means of the primary imaging optical system 3, e.g. an objective, sent and displayed on the primary optical sensor 2, e.g. a CCD chip, where the optical input image 12 is converted to an electric signal 8. The electric signal 8 is further sent to the electronic control unit 1 for processing. In the second stage, the electronic control unit 1 processes the scenic image 11 and/or the input image 12 on the basis of the signal 8 and evaluates places where objects emitting useful information may be situated. Useful information in the form of a light car2car or car2X signal can be emitted, e.g., by infrastructure 15 and/or the lighting devices 18, 19 of vehicles travelling in the opposite or the same direction, or standing vehicles 16, 17. These information-bearing places are associated with individual positions 20 of pixels on the primary optical sensor 2, especially a CCD chip. Subsequently, the position 20 of a pixel is converted 21 to the DMD position 22 of individual mirrors of the DMD array 7. Individual positions 20, 22 differ from each other by their resolution and structure of displayed information. The information about the DMD positions 22 is subsequently sent as a control signal 9 to the DMD array 7. Based on the algorithm of the electronic control unit 1, the third stage follows, when the control signal 9 is sent to the DMD array 7 of mirrors to reroute the input image 12 via the optical member 5. e.g. a focusing optical system, to the secondary optical sensor 4, e.g. a phototransistor. The secondary optical sensor 4 converts the optical signal in the form of the input image 12 to an electric signal 10, which is subsequently sent to the electronic control unit 1 for processing and decoding.

At the moment the primary optical sensor 2 is ready to receive the next input image, the mirrors of the DMD array 7 are already tilted to a position ensuring transmission of the input image 12 to the primary optical sensor 2. At the time the primary optical sensor 2 is acquiring the recording again, i.e. the first stage occurs again, the signal 10 from the secondary optical sensor 4 is evaluated and decoded information 13 is produced. Decoded information 13 is continuously and/or alternately from individual optical sensors 2, 4 provided to the electronic equipment 14 of the vehicle, e.g. is shown on the display for the driver. The decoded information 13 can be, e.g., panic braking, an obstacle on the way, a traffic jam, an accident, climatic situation, condition of the carriageway, time until the green light, time until the red light, or insufficient distance.

The electronic control unit 1 can, e.g., process optical information from the scenic image 11/input image 12 through the primary optical sensor 2 that does not come from another vehicle or infrastructure, i.e. is not obtained based on a car2car or car2X signal. Such information can be, e.g., information about what object a particular car2car or car2X signal is emitted from (e.g. from a vehicle in the same lane, in the left lane, from traffic lights), i.e. where the particular signal is sent from. Conversely, as described above, the secondary optical sensor 4 is used by the electronic control unit to find out what a particular object is emitting, i.e. the contents of particular information sent via car2car or car2x signals. Another example of optical information from a scenic image 11/input image 12 that does not come from another vehicle or infrastructure and is not obtained based on a car2car or car2X signal is, e.g., information important for the activity of adaptive cruise control or a collision warning/automatic braking system (e.g. distance from the vehicle ahead, its instantaneous speed, etc.). This information can be, e.g., obtained by the primary optical sensor 2 and further processed by the electronic control unit 1, which can send the respective resulting information 13 to the electronic equipment 14 based on this processing.

Through the electronic equipment 14 of the vehicle, a command can be issued to send a car2car or car2X signal to the owner of the infrastructure 15 or other vehicles 16, 17, e.g. by means of the lighting devices 18, 19. Individual vehicles evaluate the received car2car data and possibly provide them to other vehicles 16, 17 in the vicinity. Through mutual distribution of information in the form of a light signal emitted by means of the lighting device 18, 19, the electronic equipment 14 of the vehicles 16, 17 can use the obtained data to change the planned route or to make the driver avoid critical places by means of the navigation system. Through the distribution of information about the positioning and current status of infrastructure 15, electronic equipment 14 of vehicles 16, 17 can, e.g., calculate the optimum speed of the vehicles 16, 17 so that the vehicles 16, 17 can pass the respective intersection at the green light, also with respect a possible change of the driving direction or speed.

LIST OF REFERENCE MARKS

1—electronic control unit
2—primary optical sensor
3—primary imaging optical system
4—secondary optical sensor
5—optical member
6—secondary optical imaging system
7—DMD array
8—electric signal
9—control signal
10—electric signal
11—scenic image
12—input image
13—information
14—electronic equipment
15—infrastructure
16—oncoming vehicle
17—vehicle travelling in the same direction
18—rear lighting device
19—front lighting device
20—pixel positions
21—conversion
22—DMD position

What is claimed is:

1. A communication device of a motor vehicle, the communication device comprising:
    a primary imaging optical system to create an input image from a received scenic image, wherein the scenic image may comprise a light vehicle-to-vehicle communication, a light vehicle-to-infrastructure communication including traffic-relevant information, or a combination thereof, wherein the light vehicle-to-vehicle communication is a signal that is emitted by a lighting device of a vehicle and includes the traffic-relevant information coded in the scenic image, wherein the light vehicle-to-infrastructure communication is a signal that is emitted by infrastructure and includes the traffic-relevant information coded in the scenic image;
    a primary optical sensor;
    a secondary imaging optical system;
    an electronic control unit; and
    a digital micromirror device array of mirrors for a reception of the input image and its subsequent transmission via the secondary imaging optical system to the primary optical sensor,
    wherein the digital micromirror device array of mirrors is connected to the electronic control unit,
    wherein the primary optical sensor is adapted to convert the input image received from the digital micromirror device array of mirrors to an electric signal and to send the electric signal to the electronic control unit,
    wherein the electronic control unit is configured to—
        (i) process the electric signal to thereby determine positioning of the light vehicle-to-vehicle communication or the light vehicle-to-infrastructure communication in the input image,
        (ii) convert positions of pixels corresponding to the light vehicle-to-vehicle communication or the light vehicle-to-infrastructure communication on the primary optical sensor to positions of individual mirrors in the digital micromirror device array of mirrors, and
        (iii) send a control signal to the digital micromirror device array of mirrors for the digital micromirror device array of mirrors to change position of the individual mirrors to thereby send a selection image that includes only those parts of the input image where the light vehicle-to-vehicle communication or the light vehicle-to-infrastructure communication were determined, via an optical member to a secondary optical sensor, wherein the secondary optical sensor is configured to convert the selection image to a second electric signal and to send the second electric signal to the electronic control unit for the electronic unit to evaluate the second electrical signal and create decoded information,
    wherein the electronic control unit is further connected to electronic equipment of the vehicle for the transfer of decoded information from the primary optical sensor, the secondary optical sensor, or the primary optical sensor and the secondary optical sensor to the electronic equipment of the vehicle.

2. The communication device in accordance with claim 1, wherein the position of the mirrors of the digital micromirror device array of mirrors is controlled by the electronic control unit by the control signal in such a way that after sending the selection image to the secondary optical sensor, the position of the mirrors can be reset for sending of the subsequent input image to the primary optical sensor.

3. The communication device in accordance with claim 1, wherein the light vehicle-to-vehicle communication is emitted by a lighting device of an oncoming vehicle, a vehicle travelling in the same direction, or a standing vehicle.

4. The communication device in accordance with claim 1, wherein the light vehicle-to-infrastructure communication or the light vehicle-to-vehicle communication provides one or more of the following types of traffic-relevant information: information about the duration of individual colors of traffic lights, or information about the traffic situation, including panic braking, traffic density, traffic jams, conditions of surrounding vehicles, obstacles on the way, congestions, accidents, climatic conditions, carriageway conditions, or insufficient distance.

5. The communication device in accordance with claim 1, wherein the motor vehicle comprises a light device to send the light vehicle-to-vehicle communication or the light vehicle-to-infrastructure communication to the owner of infrastructure or other vehicles and the electronic equipment of the motor vehicle is connected to this light device to ensure the possibility of issuing a command for this light device to emit the light vehicle-to-vehicle communication or the light vehicle-to-infrastructure communication based on the decoded information.

6. The communication device in accordance with claim 5, wherein the light device is part of lighting equipment of the motor vehicle.

7. The communication device in accordance with claim 1, wherein the electronic equipment is an application unit or an on-board unit.

8. The communication device in accordance with claim 1, wherein the primary imaging optical system is an objective lens.

9. The communication device in accordance with claim 1, wherein the primary optical sensor is a charge-coupled device chip.

10. The communication device in accordance with claim 1, wherein the optical member is a focusing optical system.

11. The communication device in accordance with claim 1, wherein the secondary optical sensor is a phototransistor.

\* \* \* \* \*